(12) United States Patent
Gerstler et al.

(10) Patent No.: US 9,909,448 B2
(45) Date of Patent: Mar. 6, 2018

(54) GAS TURBINE ENGINE COMPONENT WITH INTEGRATED HEAT PIPE

(71) Applicant: General Electric Company, Schenectady, NY (US)

(72) Inventors: William Dwight Gerstler, Niskayuna, NY (US); James Michael Kostka, Loveland, OH (US); Jeffrey Douglas Rambo, Mason, OH (US); John William Moores, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 188 days.

(21) Appl. No.: 14/686,799

(22) Filed: Apr. 15, 2015

(65) Prior Publication Data

US 2016/0305279 A1    Oct. 20, 2016

(51) Int. Cl.
| | |
|---|---|
| *F01D 9/04* | (2006.01) |
| *F01D 25/12* | (2006.01) |
| *F01D 25/18* | (2006.01) |
| *F01D 5/18* | (2006.01) |
| *F02C 7/14* | (2006.01) |

(52) U.S. Cl.
CPC .............. *F01D 25/12* (2013.01); *F01D 5/181* (2013.01); *F01D 9/04* (2013.01); *F01D 9/041* (2013.01); *F01D 25/18* (2013.01); *F02C 7/14* (2013.01); *F05D 2220/32* (2013.01); *F05D 2240/12* (2013.01); *F05D 2260/208* (2013.01); *F05D 2260/232* (2013.01)

(58) Field of Classification Search
CPC .......... F01D 9/041; F01D 5/181; F01D 25/12; F01D 25/18; F01D 9/04; F02C 7/14; F05D 2220/32; F05D 2240/12; F05D 2260/208; F05D 2260/232

See application file for complete search history.

(56) References Cited

U.S. PATENT DOCUMENTS

| | | | |
|---|---|---|---|
| 4,419,044 A | * | 12/1983 | Barry ...................... F01D 11/24 415/117 |
| 4,771,365 A | | 9/1988 | Cichocki et al. |
| 5,227,957 A | | 7/1993 | Deters |
| 5,439,351 A | | 8/1995 | Artt |

(Continued)

FOREIGN PATENT DOCUMENTS

| | | |
|---|---|---|
| CN | 104776740 A | 7/2015 |
| DE | 2826998 C1 | 6/1995 |

(Continued)

OTHER PUBLICATIONS

Brown et al., "Thermal Management Issues and Evaluation of a Novel, Flexible Substrate, 3-Dimensional (3-D) Packaging Concept", 1998 International Conference on Multichip Modules and High Density Packaging, pp. 135-140, Apr. 15-17, 1998.

(Continued)

*Primary Examiner* — Igor Kershteyn
(74) *Attorney, Agent, or Firm* — General Electric Company; Brian P. Overbeck

(57) ABSTRACT

A heat transfer apparatus for a gas turbine engine includes: a component having a wall structure defining a flow bounding surface; a chamber formed in the component, the chamber including a wicking structure, a vapor channel, and a working fluid.

16 Claims, 10 Drawing Sheets

(56) References Cited

U.S. PATENT DOCUMENTS

| | | | |
|---|---|---|---|
| 5,579,830 A | 12/1996 | Giammaruti | |
| 5,975,841 A | 11/1999 | Lindemuth et al. | |
| 6,233,150 B1 | 5/2001 | Lin et al. | |
| 6,359,218 B1 | 3/2002 | Koch et al. | |
| 6,392,883 B1 | 5/2002 | Ali | |
| 6,430,931 B1 | 8/2002 | Horner | |
| 6,624,349 B1 | 9/2003 | Bass | |
| 6,631,755 B1 | 10/2003 | Kung et al. | |
| 6,889,755 B2 | 5/2005 | Zuo et al. | |
| 7,002,247 B2 | 2/2006 | Mok et al. | |
| 7,189,064 B2 | 3/2007 | Helder et al. | |
| 7,256,992 B1 | 8/2007 | Stewart et al. | |
| 7,369,410 B2 | 5/2008 | Chen et al. | |
| 7,377,098 B2 | 5/2008 | Walker et al. | |
| 7,473,995 B2 | 1/2009 | Rumer et al. | |
| 7,594,537 B2 | 9/2009 | Hou et al. | |
| 7,900,438 B2 | 3/2011 | Venkataramani et al. | |
| 7,928,562 B2 | 4/2011 | Arvelo et al. | |
| 8,047,269 B2 | 11/2011 | Kang et al. | |
| 8,176,972 B2 | 5/2012 | Mok | |
| 8,466,486 B2 | 6/2013 | Yuan | |
| 8,475,112 B1 | 7/2013 | Ryznic et al. | |
| 8,549,749 B2 | 10/2013 | Zimbeck et al. | |
| 8,616,834 B2 | 12/2013 | Knight, III et al. | |
| 8,656,722 B2 | 2/2014 | Norris et al. | |
| 8,937,384 B2 | 1/2015 | Bao et al. | |
| 9,476,651 B2 | 10/2016 | Thiagarajan et al. | |
| 2002/0021556 A1 | 2/2002 | Dibene, II et al. | |
| 2003/0043547 A1 | 3/2003 | Nealis | |
| 2005/0050877 A1* | 3/2005 | Venkataramani ....... | F02C 7/047 60/39.093 |
| 2006/0042224 A1 | 3/2006 | Shiao et al. | |
| 2007/0012429 A1 | 1/2007 | Siu | |
| 2009/0040726 A1 | 2/2009 | Hoffman et al. | |
| 2010/0200199 A1 | 8/2010 | Habib et al. | |
| 2010/0236215 A1* | 9/2010 | Venkataramani ....... | F01D 9/065 60/39.093 |
| 2010/0320187 A1 | 12/2010 | Griffin et al. | |
| 2011/0209864 A1 | 9/2011 | Figus et al. | |
| 2012/0192574 A1 | 8/2012 | Ghoshal et al. | |
| 2012/0227926 A1 | 9/2012 | Field et al. | |
| 2012/0250259 A1 | 10/2012 | Lee et al. | |
| 2012/0331269 A1 | 12/2012 | Aras | |
| 2013/0189594 A1 | 7/2013 | Breit et al. | |
| 2014/0090808 A1 | 4/2014 | Bessho et al. | |
| 2014/0174086 A1 | 6/2014 | Kare et al. | |
| 2014/0190667 A1 | 7/2014 | McGlen et al. | |
| 2014/0284020 A1 | 9/2014 | Amir et al. | |
| 2015/0027669 A1 | 1/2015 | Kokas et al. | |
| 2015/0040888 A1 | 2/2015 | Zakhidov et al. | |
| 2017/0067693 A1 | 3/2017 | Rush et al. | |

FOREIGN PATENT DOCUMENTS

| | | |
|---|---|---|
| DE | 102011086786 B3 | 3/2013 |
| GB | 2476253 A | 6/2011 |
| TW | 289655 B | 11/2007 |
| WO | 2009120613 A1 | 10/2009 |
| WO | 2013097031 A2 | 7/2013 |

OTHER PUBLICATIONS

Rawal et al., "Thermal Management for Multifunctional Structures", IEEE Transactions on Advanced Packaging, vol. No. 22, Issue No. 3, pp. 379-383, Aug. 1999.

Hara et al., "Optimization for Chip Stack in 3-D Packaging", IEEE Transactions on Advanced Packaging, vol. No. 28, Issue No. 3, pp. 367-376, Aug. 2005.

Wu et al., "Investigation of the Polymer Wick Structure Applied to Loop Heat Pipe", 2009 4th International Microsystems, Packaging, Assembly and Circuits Technology Conference, pp. 368-371, Oct. 21-23, 2009.

Ameli et al., "A Novel Method for Manufacturing Sintered Aluminium Heat Pipes (SAHP)", Applied Thermal Engineering, vol. No. 52, Issue No. 2, pp. 498-504, Apr. 15, 2013.

European Search Report and Written Opinion issued in connection with corresponding EP Application No. 15162670.2 dated Aug. 24, 2015.

European Search Report and Written Opinion issued in connection with corresponding EP Application No. 16165250.8 on Sep. 14, 2016.

GE Related Case Form.

Mochizuki et al., "A Review of Heat Pipe Application Including New Opportunities", Frontiers in Heat Pipes, vol. No. 2, pp. 1-15, 2011.

Robak, "Latent Heat Thermal Energy Storage with Embedded Heat Pipes for Concentrating Solar Power Applications", University of Connecticut Digital Commons, pp. 1-57, Apr. 24, 2012.

Green et al., "Dynamic Thermal Management of High Heat Flux Devices using Embedded Solid-Liquid Phase Change Materials and Solid State Coolers", 13th IEEE ITHERM Conference, pp. 853-863, 2012.

Yogev et al., "PCM Storage System with Integrated Active Heat Pipe", Energy Procedia, vol. No. 49, pp. 1061-1070, 2014.

Winter, "Engineers' Guide to Military, Aerospace & Avionics", Extension Media, pp. 1-40, 2014.

De Bock et al., "Circuit Card Cartridge for an Electronic System", GE Co-pending U.S. Appl. No. 14/592,387, filed Aug. 4, 2016.

Non-Final Rejection towards related U.S. Appl. No. 14/592,387 dated Mar. 9, 2017.

Non-Final Rejection towards related U.S. Appl. No. 15/228,336 dated May 9, 2017.

Final Rejection towards related U.S. Appl. No. 14/592,387 dated Jul. 28, 2017.

"Subracks", Pixus Technologies, Retrieved from http://www.pixustechnologies.com/products/enclosure-system-solutions/subracks/?gclid=CKS30uaLjsUCFYMpjgodzIMA8g, pp. 1-13, Aug. 24, 2017.

U.S. Appl. No. 14/592,387, filed Jan. 8, 2015, Rush et al.
U.S. Appl. No. 15/228,336, filed Aug. 4, 2016, Rush et al.

* cited by examiner

GAS TURBINE ENGINE COMPONENT WITH INTEGRATED HEAT PIPE

BACKGROUND OF THE INVENTION

This invention relates generally to gas turbine engines and methods for oil cooling in such engines.

Gas turbine engines are commonly provided with a circulating oil system for lubricating and cooling various engine components such as bearings, gearboxes, electrical generators, and the like. In operation the oil absorbs a substantial amount of heat that must be rejected to the external environment in order to maintain the oil at acceptable temperatures. As engine designs evolve the amount of heat to be rejected is increasing.

Known oil cooling systems for gas turbine engines typically include one or more air-to-oil heat exchangers, referred to as "air cooled oil coolers" or "ACOCs", These heat exchangers can be heavy and have high drag, and can require special inlet and outlet ducts and large, heavy brackets. Sometimes ACOCs are used in series with fuel-to-oil heat exchangers and fuel return-to-tank systems ("FRTT") in a complex cooling network; however increasing heat loads are expected to exceed the capabilities of such systems.

It has been proposed in the prior art to circulate fluid directly inside of flow-bounding structures such as outlet guide vanes ("OGVs"). But for flight critical fluids such as lubricating oil, a damaged heat exchanger is problematic as it could cause fires or critical loss of oil.

Accordingly, there is a need for a gas turbine engine heat exchanger having low drag, which allows the oil to be separated from the heat exchanger physically, while maintaining a strong thermal connection through the cooling cycle.

BRIEF SUMMARY OF THE INVENTION

This need is addressed by the present invention, which provides a gas turbine engine flow bounding structure which includes an integral heat exchanger apparatus.

According to one aspect of the invention, a heat transfer apparatus for a gas turbine engine includes: a component having a wall structure defining a flow bounding surface; and a chamber formed in the component, the chamber including a wicking structure, a vapor channel, and a working fluid.

According to another aspect of the invention, the chamber is integrally formed with the wall structure.

According to another aspect of the invention, the wall structure transitions from a solid structure at the flow bounding surface to a permeable structure at an inner surface.

According to another aspect of the invention, the wall structure comprises a three-dimensional mass having an array of spaced-apart, mutually perpendicular holes passing therethrough.

According to another aspect of the invention, the holes are arranged in two or more layers, the holes of each layer having different diameters.

According to another aspect of the invention, the component includes an airfoil having opposed pressure and suction sidewalls, a root, a tip, and spaced-apart leading and trailing edges;

According to another aspect of the invention, the chamber extends beyond the root or the tip of the airfoil.

According to another aspect of the invention, the wicking structure spans the space between the sidewalls; and a series of spanwise vapor channels extend through the wicking structure.

According to another aspect of the invention, the wicking structure spans the space between the sidewalls; and a spanwise vapor channel having an airfoil-shaped cross-section extends through a central portion of the wicking structure.

According to another aspect of the invention, a plurality of supports extend transversely between the pressure and suction sidewalls; and at least a portion of at least one of the supports comprises a permeable material defining a part of the wicking structure.

According to another aspect of the invention, a portion of the chamber extends beyond the remainder of the component; and a sump enclosing the extended portion of the chamber and configured for circulation of a fluid therethrough.

According to another aspect of the invention, a portion of the chamber extends beyond the remainder of the component; and a fluid conduit is disposed in contact with the extended portion of the chamber.

According to another aspect of the invention, the fluid conduit has an annular outer wall; and the extended portion of the chamber has a concave saddle shape that contacts the outer wall of the fluid conduit.

According to another aspect of the invention, a portion of the chamber extends beyond the remainder of the component; and a stub portion of a fluid conduit is formed as part of a single monolithic structure with the extended portion of the chamber.

According to another aspect of the invention, a heat transfer apparatus for a gas turbine engine, includes: a plurality of components arranged in a ring around the engine and extending in a generally radial direction so as to define opposed inboard and outboard ends, each component having: a wall structure defining a flow bounding surface; and a chamber formed in the component, the chamber including a wicking structure, a vapor channel, and a working fluid, wherein the chamber includes an evaporator end and an opposed condenser end; wherein, for some of the chambers, the evaporator end is positioned at the inboard end of the corresponding component, and for others of the chambers, the evaporator end is positioned at the outboard end of the corresponding component.

According to another aspect of the invention, the evaporator end of each chamber is positioned such that gravity will assist fluid flow from the condenser end to the evaporator end, for a predetermined orientation of the engine.

According to another aspect of the invention, the components are guide vanes.

BRIEF DESCRIPTION OF THE DRAWINGS

The invention may be best understood by reference to the following description taken in conjunction with the accompanying drawing Figures in which.

DETAILED DESCRIPTION OF THE INVENTION

Figure 1:
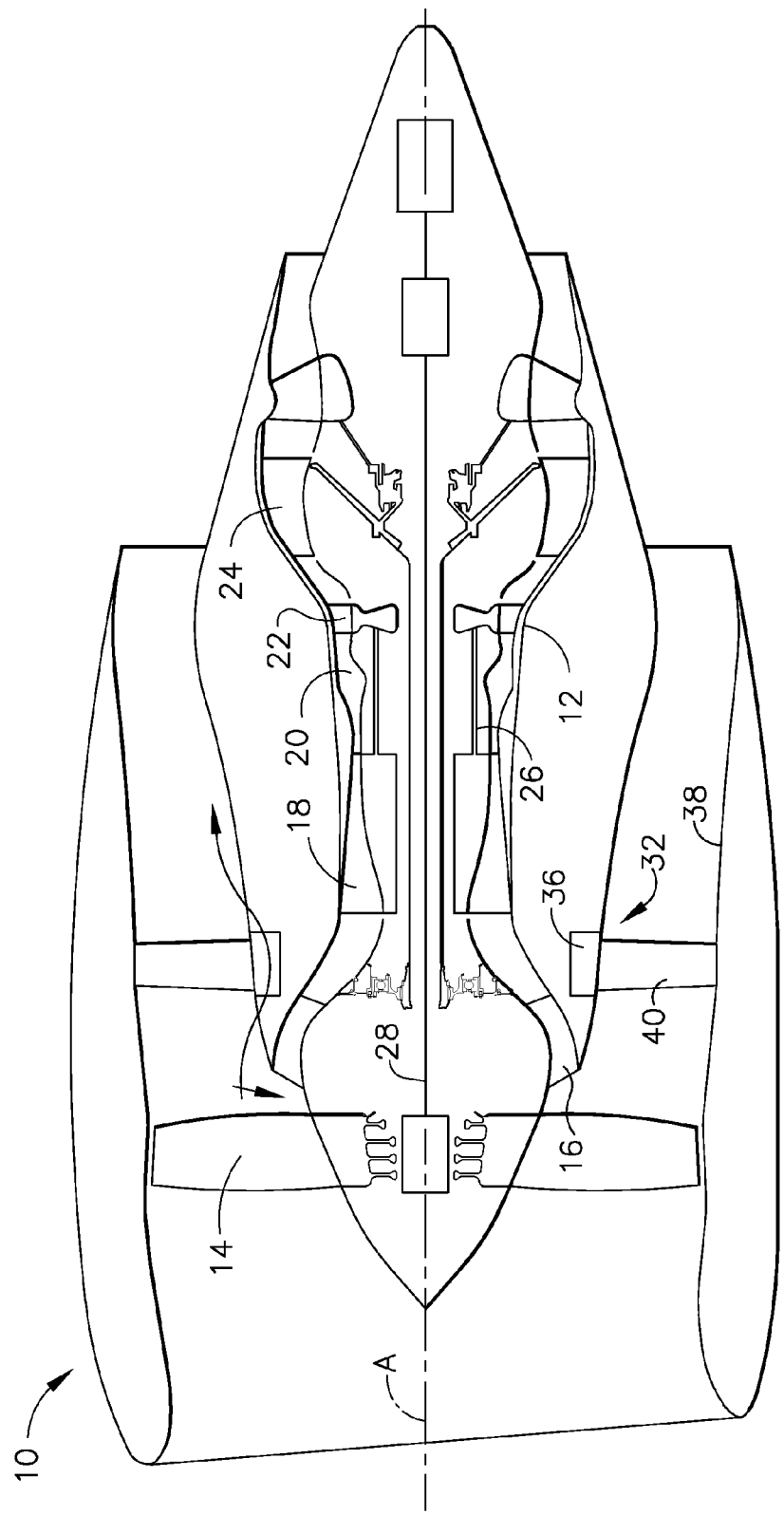
FIG. 1 is a schematic cross-sectional view of a gas turbine engine incorporating a heat exchanger system constructed according to an aspect of the present invention.

Referring to the drawings wherein identical reference numerals denote the same elements throughout the various views, FIG. 1 depicts a gas turbine engine 10 incorporating a heat exchanger apparatus constructed according to an aspect of the present invention. While the illustrated example is a high-bypass turbofan engine, the principles of the present invention are also applicable to other types of engines, such as low-bypass, turbojet, etc. The engine 10 has a longitudinal center line or axis A and an outer stationary annular casing 12 disposed concentrically about and coaxially along the axis A. The engine 10 has a fan 14, booster 16, compressor 18, combustor 20, high pressure turbine 22, and low pressure turbine 24 arranged in serial flow relationship. In operation, pressurized air from the compressor 18 is mixed with fuel in the combustor 20 and ignited, thereby generating combustion gases. Some work is extracted from these gases by the high pressure turbine 22 which drives the compressor 18 via an outer shaft 26. The combustion gases then flow into a low pressure turbine 24, which drives the fan 14 and booster 16 via an inner shaft 28.

The engine 10 includes a fan frame 32 with a central hub 36 connected to an annular fan casing 38 by an annular array of radially extending fan outlet guide vanes ("OGVs") 40 which extend across the fan flowpath. In this example, each of the OGVs 40 is both an aero-turning element and a structural support for the fan casing 38. In other configurations, separate members are provided for the aerodynamic and structural functions.

Figure 2:
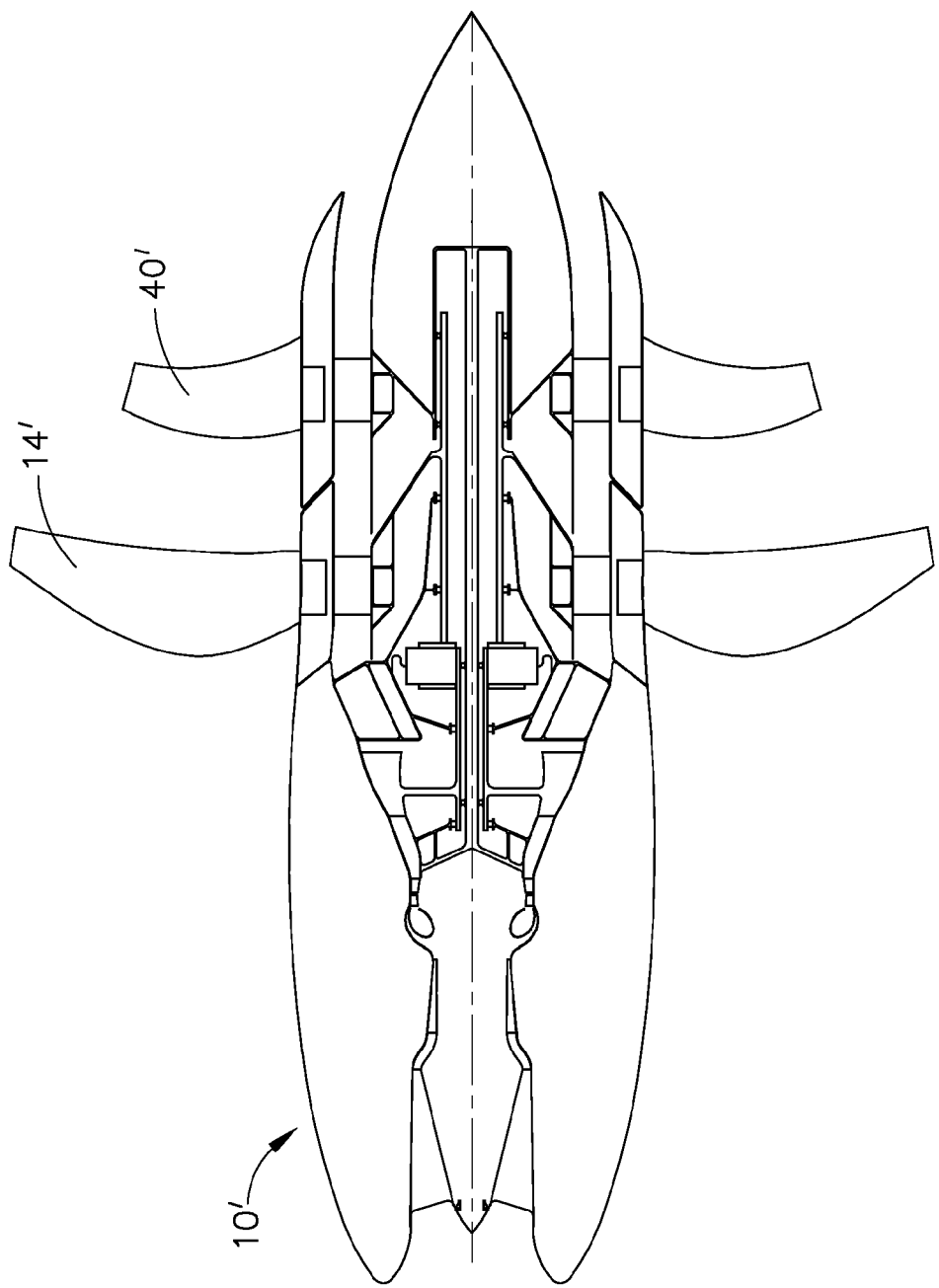
FIG. 2 is a schematic cross-sectional view of an unducted fan gas turbine engine.

While the concepts of the present invention will be described using the OGVs 40 as an example, it will be understood that those concepts are applicable to any stationary structure within the engine 10 that is configured to direct air flow and/or to form all or a portion of a channel for air flow. Such structures are referred to herein as generally as "flow bounding elements" and include a "flow bounding surface". As used herein, the term "bounding" encompasses the conventional concept of a "flow directing element" such as an airfoil which turns airflow, as well as a component which is simply exposed to airflow in operation, and therefore guides or bounds the airflow in some way, such as a part of a duct or nacelle. As one example, FIG. 2 illustrates a gas turbine engine 10' having an "unducted fan" comprising a row of external rotating fan blades 14' and a downstream row of stationary guide vanes 40'. The principles of the present invention could easily be incorporated into the guide vanes 40'.

Figure 3:
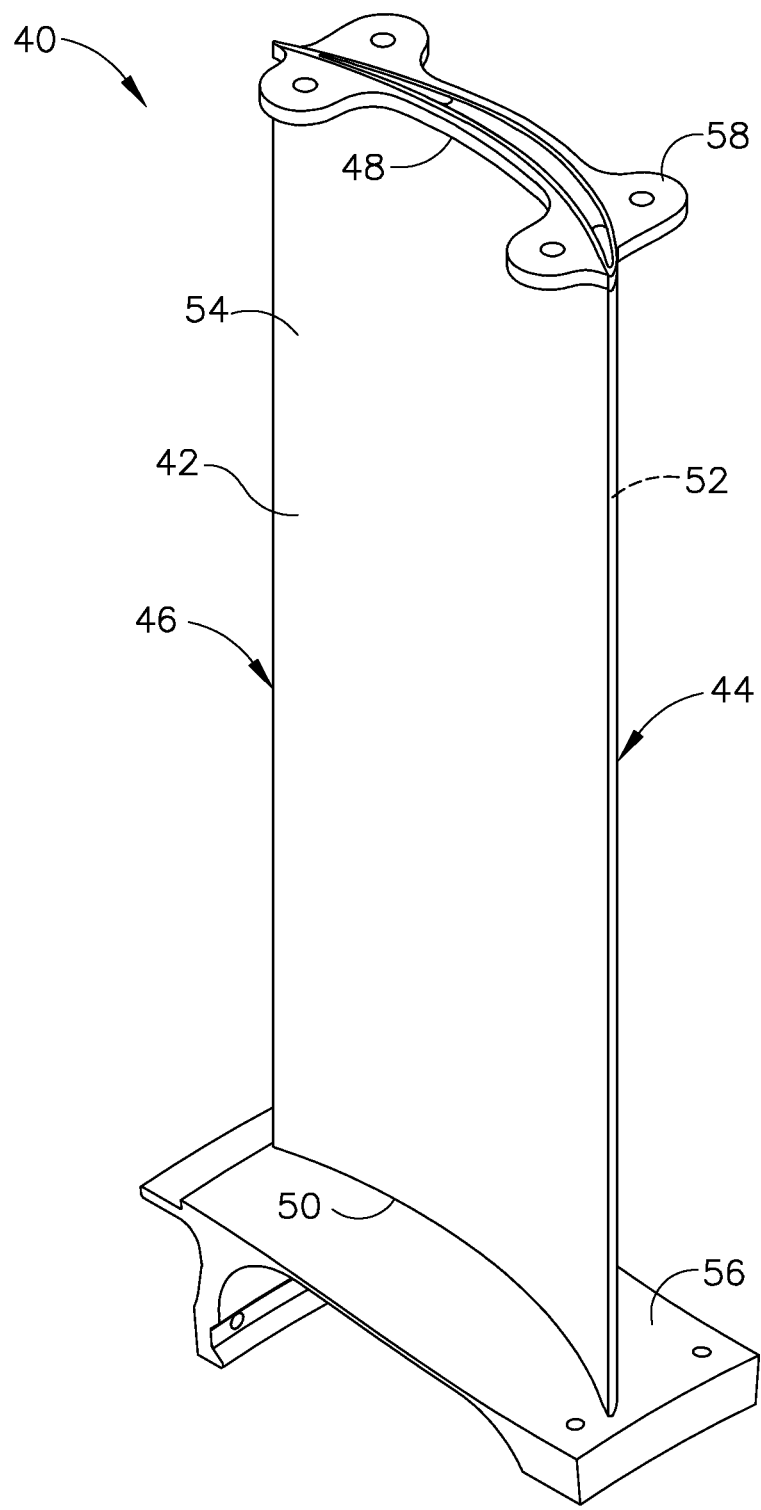
FIG. 3 is perspective view of an outlet guide vane of the gas turbine engine of FIG. 1.

Some or all of the fan OGVs 40 in the engine 10 may include heat exchangers integrated into their structure. FIG. 3 illustrates one of the fan OGVs 40 in more detail. The OGV comprises an airfoil 42 having a leading edge 44, a trailing edge 46, a tip 48, a root 50, a convex suction side 52, and a concave pressure side 54. An arcuate inner platform 56 is disposed at the root 50 of the airfoil 42 and an outer platform 58 is disposed at the tip 48. Collectively, the suction side 52, pressure side 54, inner platform 56, and outer platform 58 define "a wall structure" of the OGV 40, and collectively, the exterior surfaces of the wall structure define a "flow bounding surface".

The airfoil 42 is made from a material with suitable strength and weight characteristics for the intended application. One non-limiting example of a suitable alloy is a 7000 series aluminum alloy, in particular a 7075 aluminum alloy.

Figure 4:
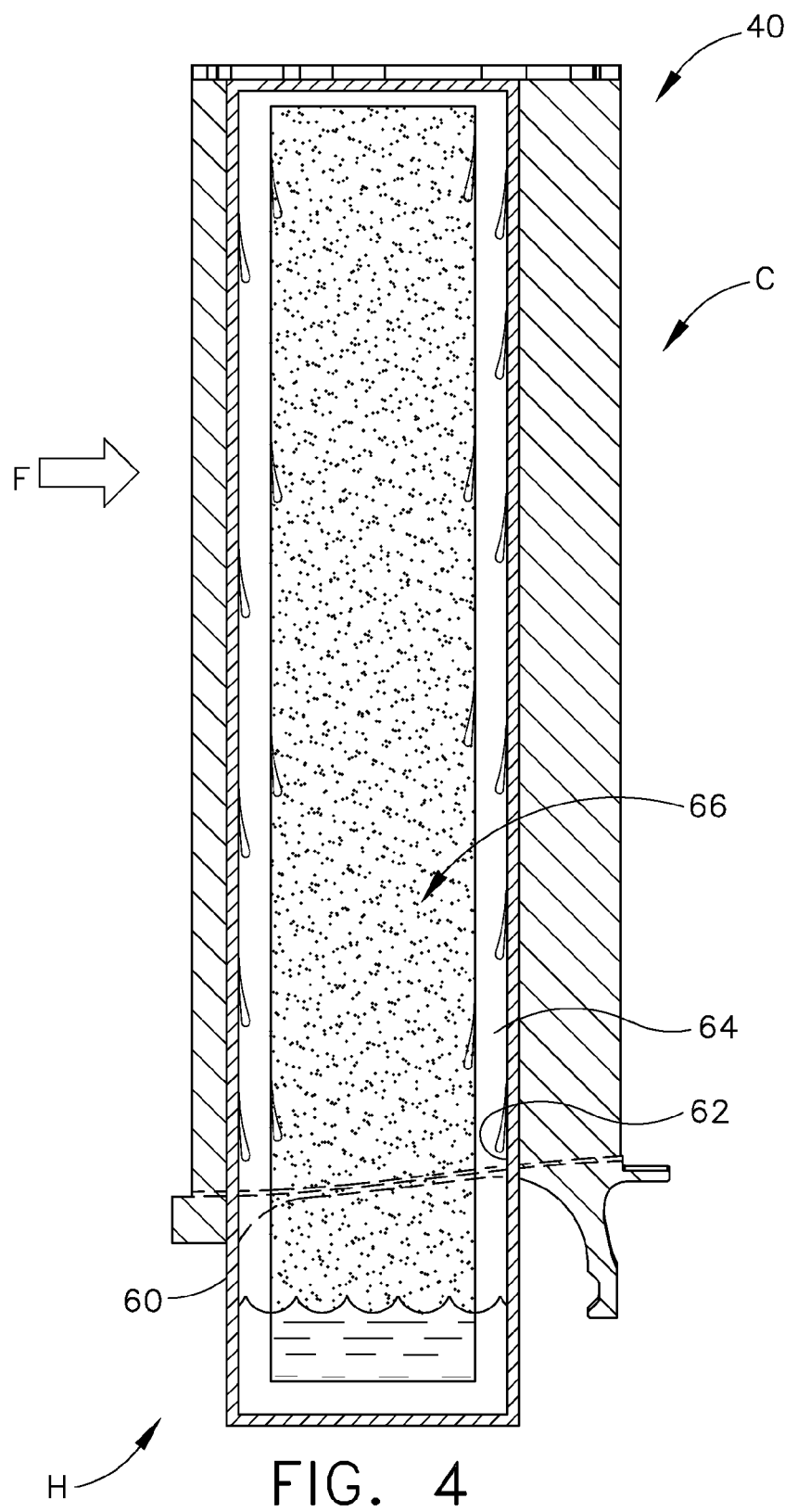
FIG. 4 is schematic functional diagram of an outlet guide vane showing the method of operation of the present invention.

The interior of the OGV 40 is configured to function as a heat pipe. As used herein the term "heat pipe" refers to any structure that functions as a heat pipe, i.e. by transporting heat from one location to another using a fluid which undergoes a phase change. It does not necessarily require a conventional pipe or tube shape. Generally, as seen in FIG. 4, the OGV 40 includes a closed chamber 60 defining an interior cavity 62. As explained in more detail below, some or all of the chamber 60 may be formed as an integral part of the OGV 40 or other flow bounding element.

The interior cavity 62 is lined with a capillary structure having numerous small channels, cavities, or pores sized in accordance with known principles to produce a capillary transport effect. This structure is referred to herein as a "wick" or "wicking structure" 64, along with at least one vapor channel 66, and holds a working fluid. Various working fluids, such as water, ammonia, glycols, alcohols, organic substances, and low-melting point metals are known for use in heat pipes. The working fluid may be non-flammable so as to avoid introducing a fire hazard in the event of a leak or break in the chamber 60.

One end of the chamber 60 is configured to be put in contact with a hot fluid (e.g. engine lubricating oil) during operation. This portion is designated as a "hot" or "evaporator" end, labeled "H". The opposite end of the chamber 60 is designated as a "cold" or "condenser" end, labeled "C" and is exposed to a flow "F" of relatively cooler fluid such as fan bypass air during engine operation. It should be noted that terms "hot", "evaporator", "cold", and "condenser", when used in relation to the chamber 60, describe the positioning of the chambers 60 in areas of relatively high or low temperature, and are not related to any particular aspect of the structure of the chambers 60 themselves.

In operation, oil which has absorbed heat from various parts of the engine is circulated into the OGV 40 where it heats the hot or evaporator end H of the OGV 40. The heat removal cools the oil to an acceptable working temperature so that it can be subsequently re-circulated through the engine 10. The heat removed is rejected to the external fluid flow F by convection. It is noted that, considering the chain of heat transfer processes from oil to external fluid flow, conduction heat transfer through the wall structure of the OGV contributes a very small fraction (e.g. less than 10%) of the total thermal resistance of the apparatus. Accordingly, the effectiveness of the OGV 40 as heat exchanger is not strongly dependent on the choice of material for the wall structure. This permits the use of a material with good mechanical performance, such as a titanium, while maintaining acceptable heat transfer performance.

Specifically, the working fluid within the chamber 60 absorbs that heat and evaporates. The vapor generated then travels through the vapor channel 66, and condenses at the cold end C of the chamber 60, thereby transferring heat to the cold end C. The wick 64 transports the condensed liquid working fluid back to the hot end H by capillary action, thereby completing the circuit. Depending on the orientation of the chamber 60, the capillary structure may not be necessary.

The heat pipe structure described herein could be used in other circumstances where an air-to-liquid heat transfer process is needed. For example, in cold climates, the heat pipe structure could be configured with the hot end H disposed in an air stream and the cold end C disposed in contact with engine oil. Heat absorbed from the air stream would heat the oil and could be used to de-congeal very cold, viscous oil. As another alternative, the heat pipe structure could be used to cool another engine fluid such as fuel. It is further noted that the heat pipe structures described herein do not necessarily require in-flight conditions, so long as the air temperature and flow conditions provide an adequate sink for the heat to be rejected.

Figure 5:
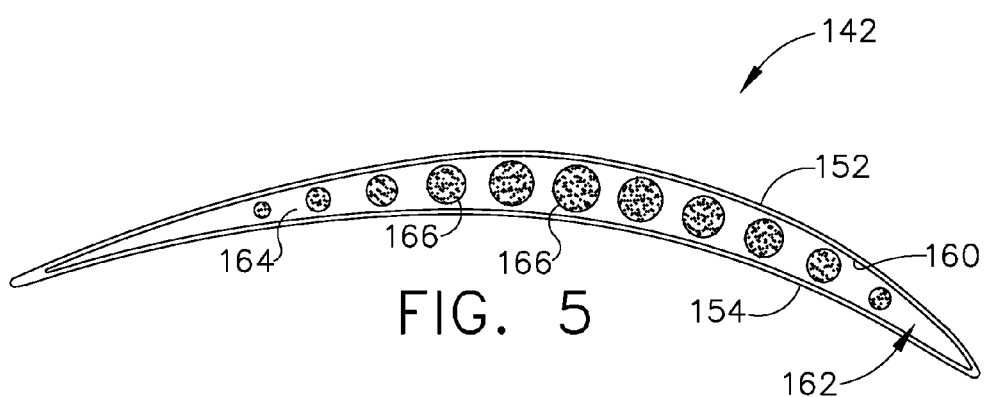
FIG. 5 is a cross-sectional view of an airfoil showing a first interior configuration.
Figure 6:
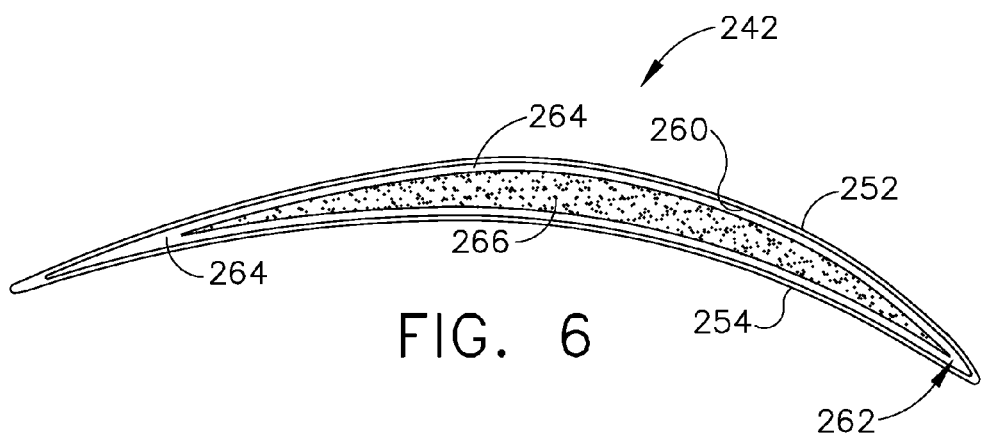
FIG. 6 is a cross-sectional view of an airfoil showing an alternative interior configuration.
Figure 7:
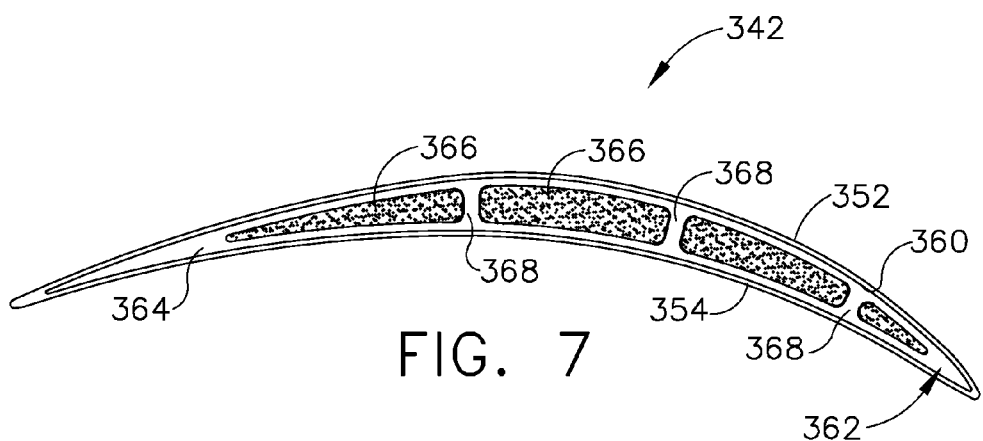
FIG. 7 is a cross-sectional view of an airfoil showing another alternative interior configuration.

The wick 64 and vapor channels 66 may be incorporated in the chamber 60 is various ways, with the goal being to optimize structure, thermal, and weight considerations. FIGS. 5-7 illustrate examples of some possible physical configurations.

FIG. 5 shows an airfoil 142, similar to the OGV 40, having pressure and suction side walls 154, 152 which collectively constitute a chamber 160 having a cavity 162 therein. A wicking structure 164 spans the space between the sidewalls 154, 152. A series of spanwise vapor channels 166 extend through the wicking structure 164. In the illustrated example the vapor channels 166 have a circular cross-sectional shape and are located approximately midway between the pressure and suction sidewalls 154, 152.

FIG. 6 shows an airfoil 242 having pressure and suction side walls 254, 252 which collectively constitute a chamber 260 having a cavity 262 therein. A wicking structure 264 spans the space between the sidewalls 254, 252. A central vapor channel 266 having an airfoil-shaped cross-section extends through the central portion of the wicking structure 264.

FIG. 7 shows an airfoil 342 having pressure and suction side walls 354, 352 which collectively constitute a chamber 360 having a cavity 362 therein. A wicking structure 364 spans the space between the sidewalls 354, 352. A vapor channel 366 extends through the central portion of the wicking structure 364. Supports 368 extend transversely between the pressure and suction sidewalls 354, 352. The supports 368 may be continuous transverse bulkheads that effectively divide the vapor channel 366 into smaller portions, or they may be individual pins or columns. Each of the supports 368 may comprise solid material, or a capillary structure, or some combination of the two. Furthermore, each of the supports 368 having varying shapes, such as prismatic or hourglass shapes.

All or part of the OGVs 40 or portions thereof may be part of a single unitary, one-piece, or monolithic component, and may be manufactured using a manufacturing process which involves layer-by-layer construction or additive fabrication (as opposed to material removal as with conventional machining processes). Such processes may be referred to as "rapid manufacturing processes" and/or "additive manufacturing processes," with the term "additive manufacturing process" being term herein to refer generally to such processes. Additive manufacturing processes include, but are not limited to: Direct Metal Laser Sintering (DMLS), Direct Metal Laser Melting (DMLM), Laser Net Shape Manufacturing (LNSM), electron beam sintering, Selective Laser Sintering (SLS), 3D printing, such as by inkjets and laser-jets, Sterolithography (SLS), Electron Beam Melting (EBM), Laser Engineered Net Shaping (LENS), and Direct Metal Deposition (DMD).

The OGVs 40 can often have a high aspect ratio, a significant amount of twist over their span, and small wall thicknesses. These characteristics tend to make manufacture using conventional methods difficult or impossible. Accordingly, additive manufacturing can be an enabling technology for manufacturing the OGVS 40 and other components described herein.

The wicking structure 64 may incorporate a gradual transition across its thickness. Starting from the outside surface, the first part of the wall thickness of the OGV 40 or other flow bounding element may be solid. It can then transition, moving inward, to become a permeable surface configured to wick liquids via capillary forces. Finally, there may be an open void area where the fluid vapor moves. The wicking structure may also be varied in a direction perpendicular to the wall surface. For example, a fine structure with small pores may be used in the hot area (evaporator) to provide lots of wicking power. But in the transition section where the liquid condensate flows back to the evaporator area, it is advantageous to have a coarse structure—thus making the fluid flow resistance lower.

Figure 11:
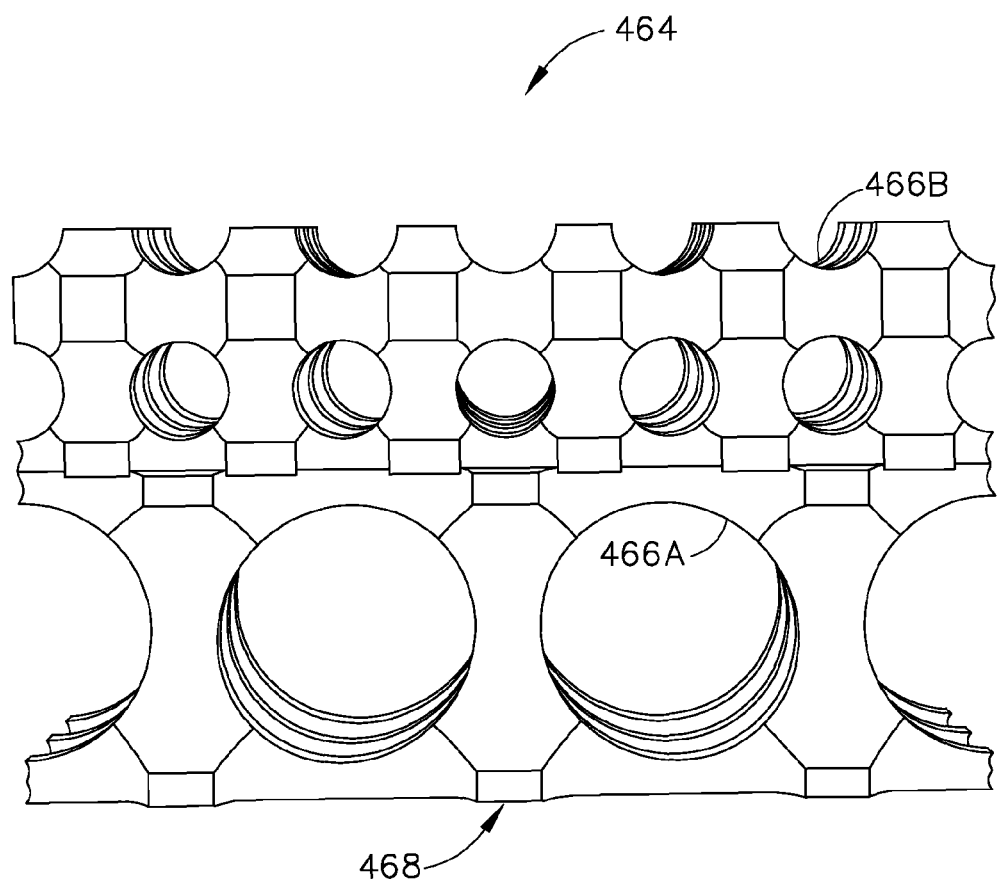
FIG. 11 is a schematic front elevation view of an exemplary heat pipe structure.

FIG. 11 illustrates an example of one possible configuration of a wicking structure 464. It is generally a three-dimensional mass having a 3D array of spaced-apart, mutually perpendicular holes 466A, 466B passing therethrough. In this example, the first group of holes 466A have a first diameter and are disposed in a layer adjacent a metal side 468 of the structure 464. The second group of holes 466B have a second diameter smaller than the first diameter, and are disposed adjacent the first layer. Multiple layers of different-sized holes may be employed. This structure 464 is particularly suitable for being formed as an integral or unitary part of a wall of flow bounding element, for example using an additive manufacturing process as noted above.

Figure 8:
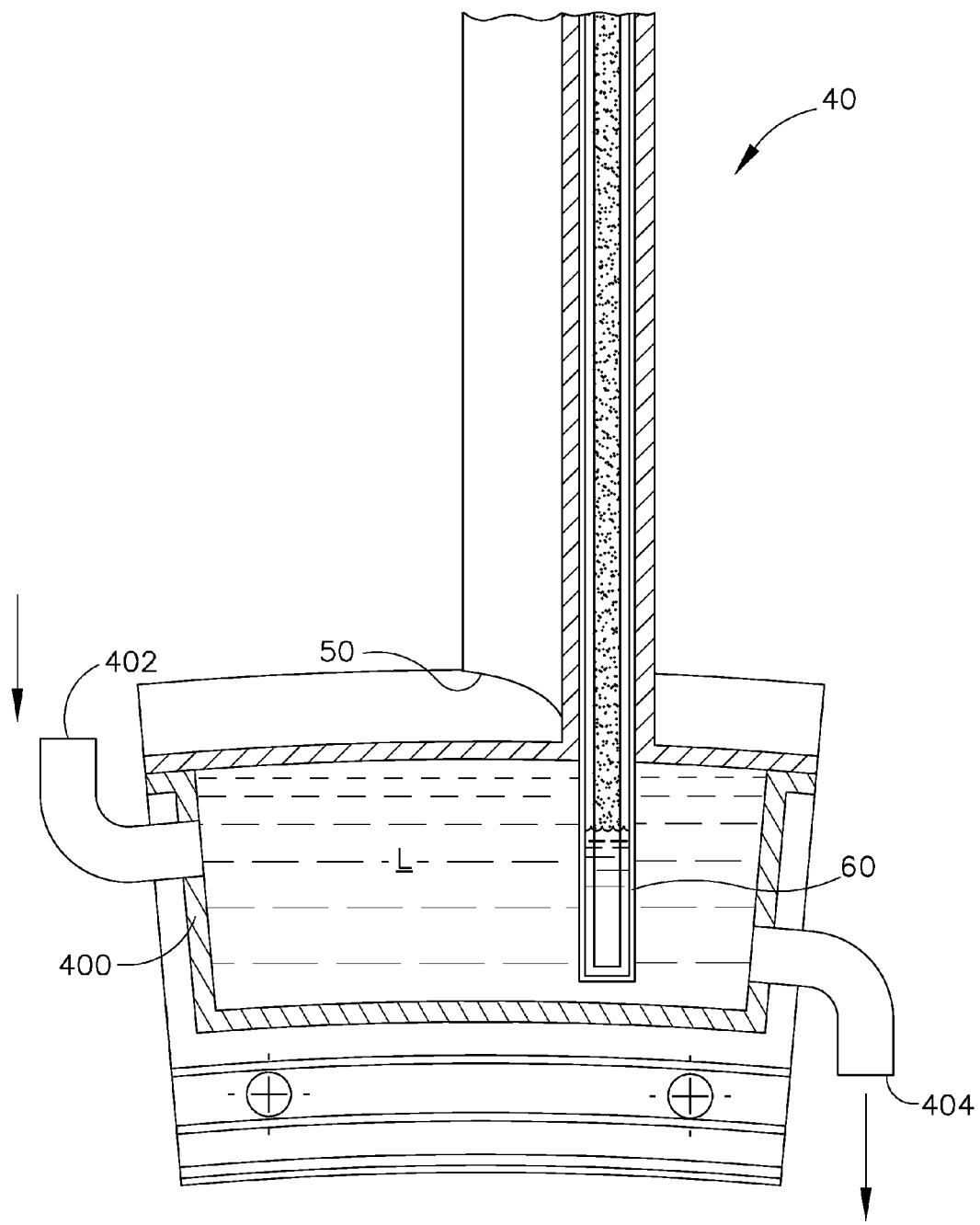
FIG. 8 is a schematic, sectional diagram of an airfoil having an integral heat pipe structure and a sump.

In use, the OGVs 40 or other flow bounding structures would be positioned in thermal contact with oil or other fluid to be cooled. FIG. 8 shows one possible apparatus for coupling the chamber 60 of an OGV 40 to fluid to be cooled. A sump 400 is formed around the base of the chamber 60, which extends past the root 50 of the OGV 40. The fluid "L" to be cooled (oil in this example) flows into the sump 400 through inlet pipe 402, where it flows around the chamber 60 and transfers heat thereto. It then flows through an outlet pipe 404. It may subsequently be routed to an adjacent OGV 40 or to another portion of an engine oil system.

Figure 9:
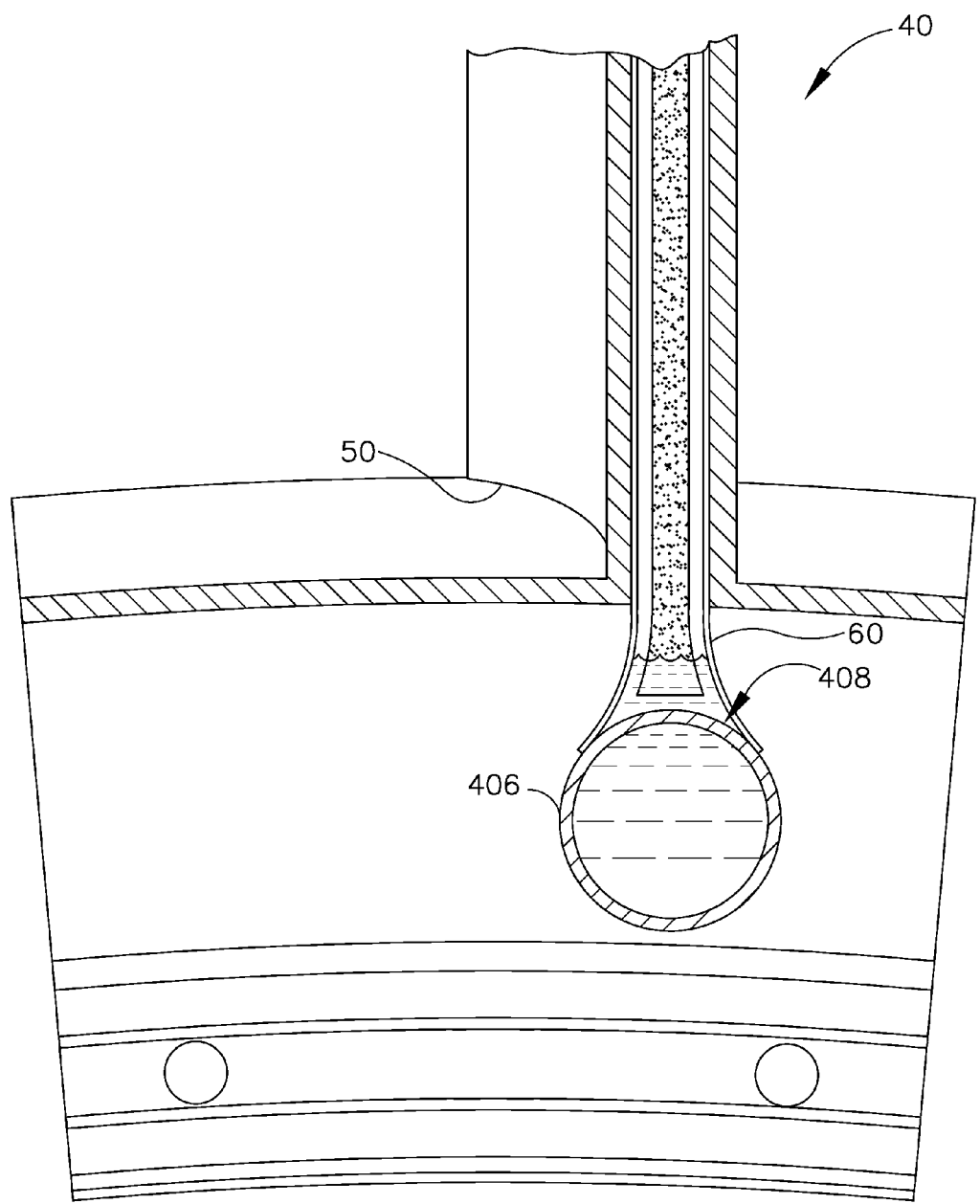
FIG. 9 is a schematic, sectional diagram of an airfoil coupled to a fluid conduit.
Figure 12:
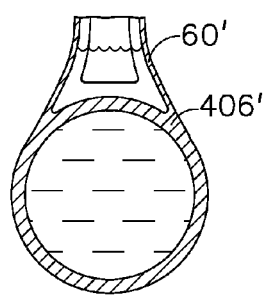
FIG. 12 is a schematic, transverse sectional view of a vapor chamber integrally coupled to a fluid conduit stub.
Figure 13:
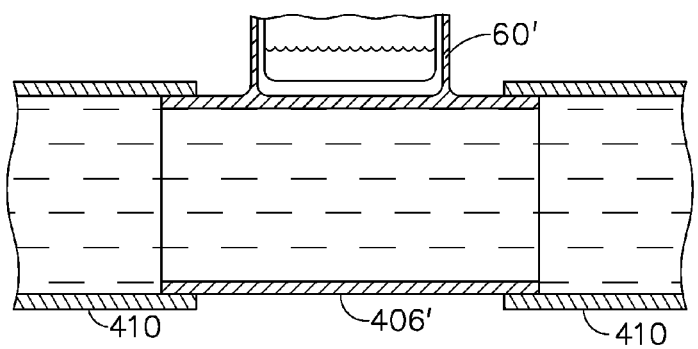
FIG. 13 is a schematic longitudinal sectional view of the vapor chamber and fluid conduit stub of FIG. 12.

FIG. 9 shows another possible apparatus for coupling the chamber 60 of an OGV 40 to fluid to be cooled. A fluid conduit 406 is routed near the root 50 of the OGV 40. The protruding end of the chamber 60 is formed into a concave saddle shape 408 which is placed in direct contact with the fluid conduit 406. Optionally, the protruding end of the chamber 60 may be joined to the fluid conduit 406, for example by brazing, welding, adhesive bonding, etc. In use, heat is transferred through the wall of the fluid conduit 406 directly to the chamber 60. Alternatively, a stub portion of a fluid conduit may be formed with a portion of the chamber as part of an integral, unitary, or monolithic whole. For example, FIGS. 12 and 13 illustrate a chamber 60' with a wall that is integral with a wall of a fluid conduit portion 406'. This configuration maximizes heat transfer capability and allows the chamber 60' to be connected to a piping system (not shown) using known types of pipe couplings, shown in FIG. 13 at 410.

Figure 10:
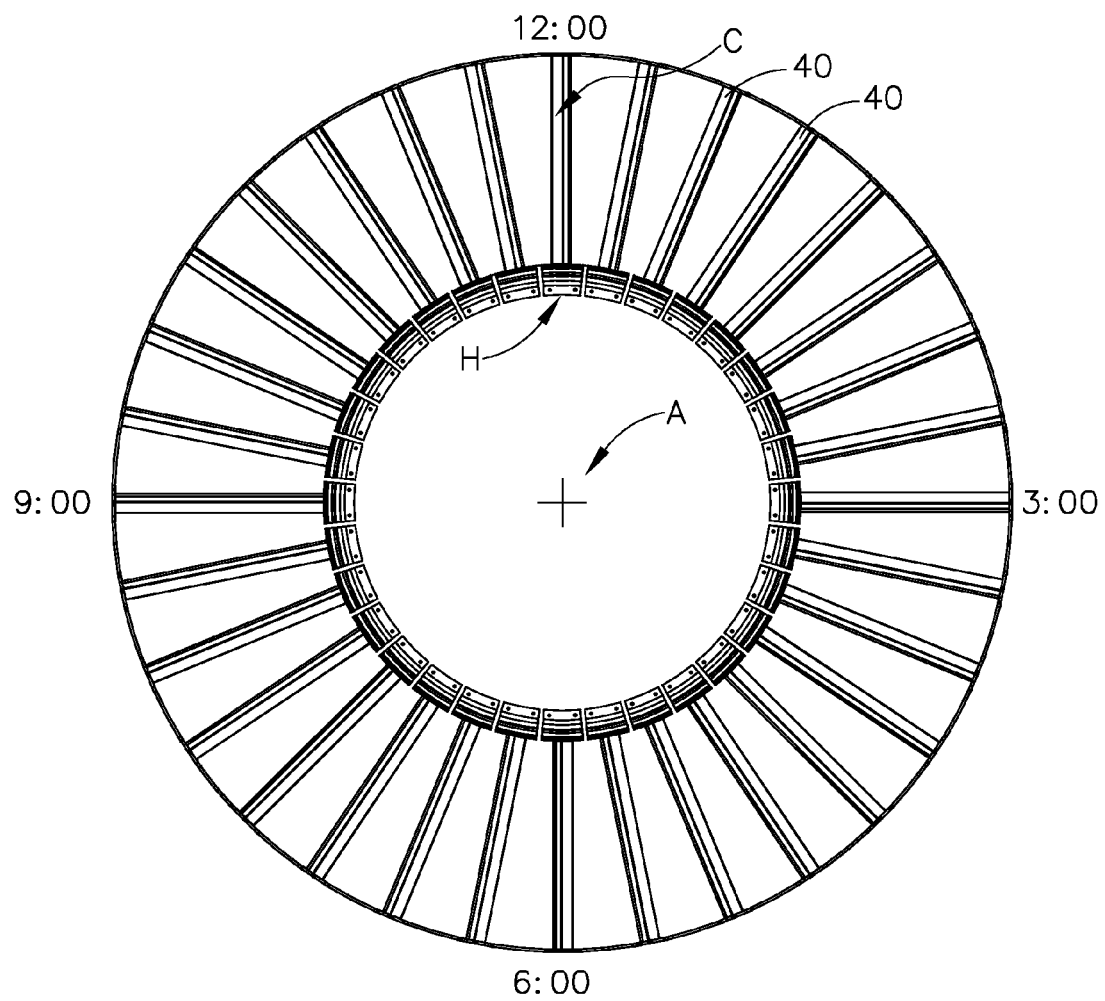
FIG. 10 is a schematic showing an annular array of airfoils.

FIG. 10 is a diagram showing an annular array or ring of OGVs 40 as they would be installed in the engine 10. For reference, the ring is labeled with clock positions, i.e. 12 o'clock, 3 o'clock, 6 o'clock, and 9 o'clock. During normal engine operation, OGV 40 at the 12 o'clock position is typically oriented so its extends vertically "up" from the engine centerline, that is, away from the Earth, and the OGV at the 6 o'clock position extends vertically "down" from the engine centerline, that is, towards the Earth.

The force balance operating on the working fluid within each OGV 40 will vary depending on its position in the ring. Gravity forces on the working fluid are always downward, while the desired return direction may be upward or downward, meaning that gravity forces may act opposite to capillary forces. For example, if the hot end H described above is positioned inboard, gravity will tend to assist return of the condensed vapor for OGVs 40 on the upper end of the ring, e.g. from slightly above 9 o'clock, through 12 o'clock, to slightly above 3 o'clock. Since gravity will work against the return of the condensed vapor below 9 o'clock through 6 o'clock to below 3 o'clock position when the hot end H is positioned inboard, the hot end H can alternately be positioned outboard for OGV 40 located for the OGVs located slightly below 9 o'clock through 6 o'clock to slightly below 3 o'clock. Therefore, with the design described herein allowing for the hot end H to be located at either the root or the tip end of the OGV 40, the practitioner can adapt the cooling architecture to increase the heat rejection capability.

The invention described herein has several advantages over the prior art. The flow bounding elements with integral heat pipes can conduct a significant heat load. The configuration prevents oil from being exposed to foreign object damage ("FOD"). Compared to prior art ACOCs, the present invention eliminates the introduction of a drag-inducing component in the fan stream and provides a higher reliability, because the heat pipe would require two failures (i.e. the wall separating heat pipe evaporator from oil reservoir and the heat pipe condenser wall separating vapor chamber from air stream) before an oil release could occur, while current state-of-the-art ACOCs can fail after a single wall rupture. The present invention combines structural, thermal, and aerodynamic functions into a single component. It allows dissipation of more heat with minimal drag. It has the potential to keep component temperatures to tolerable ranges for less expensive aluminum alloys, for example about 150° C. (300° F.) even when the fluid being cooled is hotter. It will reduce weight and drag resulting in lower specific fuel consumption ("SFC").

The foregoing has described a flow bounding element with an integral heat pipe structure. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

What is claimed is:

1. A heat transfer apparatus for a gas turbine engine, comprising:
   a component having a wall structure defining a flow bounding surface; and
   a chamber formed in the component, the chamber including a wicking structure, a vapor channel, and a working fluid, wherein
   the wall structure comprises a three-dimensional mass having an array of spaced-apart, mutually perpendicular holes passing therethrough.

2. The apparatus of claim 1 wherein the chamber is integrally formed with the wall structure.

3. The apparatus of claim 2 wherein the wall structure transitions from a solid structure at the flow bounding surface to a permeable structure at an inner surface.

4. The apparatus of claim 1 wherein the holes are arranged in two or more layers, the holes of each layer having different diameters.

5. The apparatus of claim 1 wherein the component includes an airfoil having opposed pressure and suction sidewalls, a root, a tip, and spaced-apart leading and trailing edges.

6. The apparatus of claim 5 wherein the chamber extends beyond the root or the tip of the airfoil.

7. The apparatus of claim 5 wherein:
   the wicking structure spans the space between the sidewalls; and
   a series of spanwise vapor channels extend through the wicking structure.

8. The apparatus of claim 5 wherein:
   the wicking structure spans the space between the sidewalls; and
   a spanwise vapor channel having an airfoil-shaped cross-section extends through a central portion of the wicking structure.

9. The apparatus of claim 5 wherein:
   a plurality of supports extend transversely between the pressure and suction sidewalls; and
   at least a portion of at least one of the supports comprises a permeable material defining a part of the wicking structure.

10. An apparatus comprising:
    the apparatus of claim 1, wherein a portion of the chamber extends beyond the remainder of the component; and
    a sump enclosing the extended portion of the chamber and configured for circulation of a fluid therethrough.

11. The apparatus of claim 1, wherein a portion of the chamber extends beyond the remainder of the component; and
    a fluid conduit is disposed in contact with the extended portion of the chamber.

12. The apparatus of claim 1, wherein a portion of the chamber extends beyond the remainder of the component; and a stub portion of a fluid conduit is formed as part of a single monolithic structure with the extended portion of the chamber.

13. A heat transfer apparatus for a gas turbine engine, comprising:
- a component having a wall structure defining a flow bounding surface; and
- a chamber formed in the component, the chamber including a wicking structure, a vapor channel, and a working fluid, wherein:
- a portion of the chamber extends beyond the remainder of the component;
- the fluid conduit has an annular outer wall; and
- the extended portion of the chamber has a concave saddle shape that contacts the outer wall of the fluid conduit.

14. A heat transfer apparatus for a gas turbine engine, comprising:
- a plurality of components arranged in a ring around the engine and extending in a generally radial direction so as to define opposed inboard and outboard ends, each component having:
- a wall structure defining a flow bounding surface; and
- a chamber formed in the component, the chamber including a wicking structure, a vapor channel, and a working fluid, wherein the chamber includes an evaporator end and an opposed condenser end;
- wherein, for some of the chambers, the evaporator end is positioned at the inboard end of the corresponding component, and for others of the chambers, the evaporator end is positioned at the outboard end of the corresponding component.

15. The apparatus of claim 14 wherein the evaporator end of each chamber is positioned such that gravity will assist fluid flow from the condenser end to the evaporator end, for a predetermined orientation of the engine.

16. The apparatus of claim 14 wherein the components are guide vanes.

* * * * *